United States Patent [19]

Rousset et al.

[11] Patent Number: 4,615,507

[45] Date of Patent: Oct. 7, 1986

[54] SPRING RETURN SYSTEM FOR A COMPONENT ABLE TO MOVE RECIPROCALLY

[76] Inventors: André Rousset, 8 Rue du 19 Mars 1962, Saint Priest En Jarzez, Loire; Maurice Tardy, 20 Rue Eugene Joly, Saint Etienne, Loire, both of France

[21] Appl. No.: 724,657

[22] Filed: Apr. 18, 1985

[51] Int. Cl.$^4$ ............................................. F22B 5/00
[52] U.S. Cl. ............................ 251/337; 123/188 SC; 267/170
[58] Field of Search ...................... 123/90.67, 188 SC; 251/337; 303/6 C; 267/167, 170

[56] References Cited

U.S. PATENT DOCUMENTS

| | | | |
|---|---|---|---|
| 3,008,687 | 11/1961 | Jawschek et al. | 251/337 |
| 3,084,710 | 4/1963 | Gondek | 251/337 |
| 4,241,753 | 12/1980 | Erwin et al. | 251/337 |

FOREIGN PATENT DOCUMENTS

| | | | |
|---|---|---|---|
| 13207 | 1/1982 | Japan | 123/188 SC |
| 886038 | 1/1962 | United Kingdom | 251/337 |

Primary Examiner—A. Michael Chambers
Attorney, Agent, or Firm—Remy J. VanOphem

[57] ABSTRACT

A spring return for the reciprocable slide of an hydraulic distributor. The return spring is trapped between flanges of opposed cup-shaped rings. The cup-shaped rings have conical sections which are positioned inside of the spring, but which do not contact the spring. Each cup-shaped ring has a transverse bottom, and each of the transverse bottoms surrounds the slide and contacts only a cylindrical centering section on the slide. The cylindrical centering sections on the slide are short, and each cylindrial centering section loses contact with the surrounding transverse bottom of the cup-shaped ring shortly after the slide moves relative to such cup-shaped ring.

8 Claims, 2 Drawing Figures

SPRING RETURN SYSTEM FOR A COMPONENT ABLE TO MOVE RECIPROCALLY

BACKGROUND OF THE INVENTION

1. Field of the Invention

The present invention relates to a device with a spring return, able to operate without friction, to actuate a reciprocable component. This system is applicable particularly, though not exclusively, to the return of a slide of the kind used in hydraulic distributors such as those used in circuits controlling jacks, valves, pumps, or hydraulic motors, etc. Such hydraulic circuits are used in connection with machine tools and workshop equipment, in the aeronautical industry and in various other branches of industry.

2. Description of the Prior Art

There are known slide-type hydraulic distributors in which the slide has, at one end, two cup-shaped rings with a helical spring compressed between the rings. Each of these two rings contacts a fixed wall in the stator. When the slide is not under control, it is maintained in a central position by the spring, and it is reciprocable between positions on opposite sides of the central position when it is being controlled.

In practice, friction arises during the movement of the slide, between the spring and the rings, and between the rings and the corresponding zones of the slide. This friction may lead to the appearance of high spots, which may be particularly inconvenient in the case of a distributor whose slide has its axial movement controlled by a variable pilot pressure. In fact, at any moment, the axial position of the slide is defined by the balance of two opposing forces, namely the thrust at that moment of the spring, and the force exercised by the pilot pressure. When the pilot pressure is itself variable, the variable thrust force which results from it must be balanced by the resistance force of the spring, and it will be seen that the balance may be distorted if friction resistances appear.

SUMMARY OF THE PRESENT INVENTION

The present invention is intended to avoid the foregoing disadvantages of the prior art, by providing a spring return system which substantially eliminates friction throughout the operational travel of the movable component, distributing slide or other device.

A spring return system for a component with reciprocal movement, according to the present invention, has two cup-shaped rings which are fitted in opposition to the same end of the movable component. The bottom of the cup of each ring is provided with a central aperture which surrounds a zone of smaller diameter of the movable component and contacts a shoulder of the movable component, a helical spring being arranged around the movable component and the two rings so as to be compressed between the flanges of these rings. Characteristics of the spring return system of the present invention are that each ring has a body in the external shape of a truncated cone which enlarges in the direction of the flange which contacts the stator, the flange being attached to the funnel-shaped truncated part by a zone which is a cylinder of revolution; and the zone of the movable component located between the bottoms of the two rings is of a smaller diameter than that of the central aperture in the bottom of each ring.

According to another characteristic of the invention, each of the two shoulders of the movable component is attached to its reduced section by a short cylindrical zone of revolution, and the axial length of each short cylindrical zone is equal to the thickness of the bottom of the corresponding ring.

According to another characteristic of the invention, each truncated zone of the body of a ring is attached to the end flange by a cylindrical zone of revolution, and the axial length of each such cylindrical zone is approximately equal to the diameter of the metal wire used in the helical spring.

The attached drawing, given by way of nonlimiting example, when viewed in conjunction with the following description thereof, the detailed description of the invention, and the appended claims will allow the characteristics of the present invention to be better understood.

DETAILED DESCRIPTION OF THE PREFERRED EMBODIMENT

Figure 1:
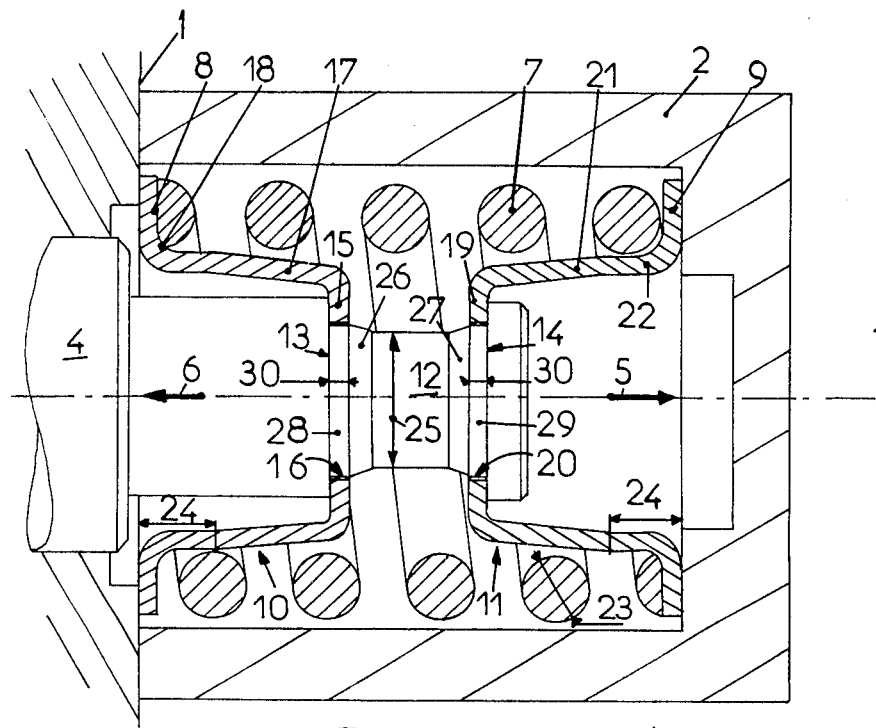
FIG. 1 is a view in axial section showing the return end of a hydraulic distributor slide activated by a variable pilot pressure, the assembly being shown in the central rest position.

As is shown in the drawing, a stator 1 of a hydraulic distributor terminates, at one end, in a fixed casing 2, into which the recall end 3 of a distributor slide 4 projects in a way which is known in the art. As is shown by arrows 5 and 6 in FIG. 1, the movements of the slide 4 in one direction or the other to opposite sides of the neutral position shown in FIG. 1 are controlled by known methods, not shown, principally by a pilot pressure of variable value.

The return of the slide 4 to the neutral position shown in FIG. 1 is insured by a helical spring 7, compressed between the base flanges 8 and 9 of two rings 10 and 11, respectively. The rings 10 and 11 are fitted in opposition to one another around a reduced section 12 of the recall end 3 of the slide 4, between spaced apart shoulders 13 and 14 on the recall end 3.

The ring 10 has the shape of a cup of revolution and has a transverse bottom 15 which is drilled with a circular central opening 16. The portion of the transverse bottom 15 which surrounds the circular central opening 16 contacts the shoulder 13 when the slide 4 is in the central rest position. The transverse bottom 15 is connected to the base flange 8 by a portion in the shape of a truncated cone of revolution 17 which enlarges to a section portion 18, which is a cylinder of revolution, which, in turn, is attached to the flange 8.

Similarly, the ring 11 has a transverse bottom 19 which is drilled with a circular opening 20, and the transverse bottom 19 is connected by a funnel-shaped truncated cone 21 to a cylindrical section of revolution 22 which, in turn, is attached to the flange 9.

The helical spring 7 is compressed between the two flanges 8 and 9 of the rings 10 and 11, respectively, and the bottoms 15 and 19 of the rings 10 and 11 are, thus, held in contact with the shoulders 13 and 14 when the spring is in the neutral central position, as is shown in FIG. 1.

The diameter 23 of the metal wire of the spring 7 is approximately equal to the axial length 24 of each of the two cylindrical sections 18 and 22. Additionally, the central reduced section 12 is a cylinder of revolution with a diameter 25 smaller than the diameter of the openings 16 and 20. This central reduced section 12 is connected on each side to a funnel-shaped truncated cone 26 and 27, and the truncated cones 26 and 27, in turn, are connected to centering cylinders of revolution 28 and 29, respectively, at the center of each shoulder 13 and 14. The axial length 30 of each of the centering cylinders 28 and 29 is approximately equal to the thickness of the bottoms 15 and 19 of the corresponding ring 10 and 11. Finally, the fixed cap or casing 2 has a sufficiently large internal diameter to provide for a large clearance of the assembly of the spring 7 and the rings 10 and 11 within the casing 2.

Figure 2:
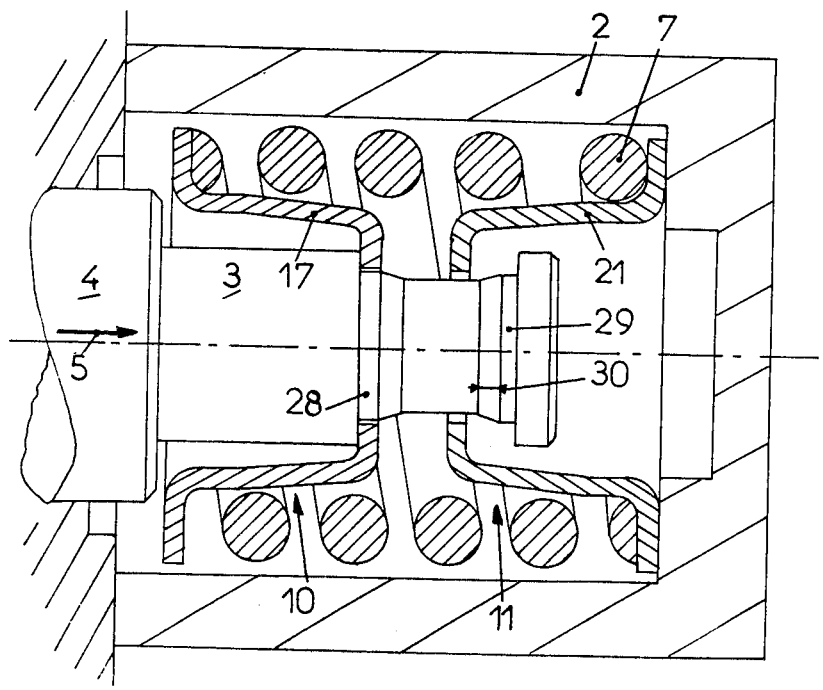
FIG. 2 is a view similar to FIG. 1 in which the distributor slide is displaced to the right, compressing its return spring.

The operation is as follows:

When the control device, not shown, displaces the distributing slide 4 towards the right in the direction of the arrow 5, as is shown in FIG. 2, the slide is immobilized in the position at which the opposing forces due to the control pressure and to the reaction of the spring 7, then compressed to a greater or lesser extent, are in balance. As regards the components which are in movement, it will be seen from FIG. 2 that no friction is possible between such components. As for the ring 11, which loses contact with the recall end 3 of the slide 4, there is friction only at the beginning of the travel, when it is aligned with the centering cylinder 29 because the axial length 30 of the centering cylinder 29 is small, the friction will cease, that is to say that the ring 11 will no longer be in contact with the slide 4, as soon as the zone of control of the fluid passing through the distributor is reached.

In addition, only the last spiral of each of the two ends of the spring 7 is in contact with the corresponding one of the cylindrical centering sections 18 and 22 of the rings 10 and 11, respectively; the other parts of the spring do not rub in any way on the rest of the body of the rings 10 and 11 because of the conical shape of the cones 17 and 21 of the rings 10 and 11, respectively.

Having thus described the present invention by way of an exemplary embodiment, it will be apparent to those skilled in the art that many modifications may be made from the exemplary embodiment without departing from the spirit of the present invention or the scope of the claims appended thereto.

What is claimed is:

1. A spring return device comprising:
    a casing having a first shoulder and a second shoulder;
    a reciprocable slide at least a part of which is positioned in said casing and is reciprocable therein, said reciprocable slide comprising:
        first and second shoulders, said first and second shoulders being spaced apart from one another;
        a first portion extending from said first shoulder toward said second shoulder;
        a second portion extending from said second shoulder toward said first shoulder; and
        an intermediate portion extending between said first portion and said second portion, the radial extent of said intermediate portion being smaller than the radial extent of each of said first portion and said second portion;
    first and second cup-shaped rings positioned in said casing surrounding said reciprocable slide, each of said first and second cup-shaped rings comprising:
        a transverse bottom with an opening therein, each said opening surrounding one of said first portion and said second portion of said reciprocable slide, said transverse bottom of said first cup-shaped ring being adapted to contact said first shoulder of said reciprocable slide, said transverse bottom of said second cup-shaped ring being adapted to contact said second shoulder of said reciprocable slide;
        a flange extending radially outwardly from each said cup-shaped ring, said flange of said first cup-shaped ring being adapted to contact said first shoulder of said casing, said flange of said second cup-shaped ring being adapted to contact said second shoulder of said casing;
        a truncated cone extending from said transverse bottom toward said flange, with the smaller end of said truncated cone being adjacent to said transverse bottom; and
        a cylindrical section extending between said flange and the larger end of said truncated cone; and
    a helical spring formed from a metal wire extending between said flange of said first cup-shaped ring and said flange of said second cup-shaped ring and surrounding said transverse bottom of said first cup-shaped ring, said transverse bottom of said second cup-shaped ring, and said first and second portions of said reciprocable slide.

2. The spring return device according to claim 1 wherein:
    said first portion of said reciprocable slide is cylindrical in shape and has an axial length which is approximately equal to the thickness of said transverse bottom of said first cup-shaped ring; and
    said second portion of said reciprocable slide is cylindrical in shape and has an axial length which is approximately equal to the thickness of said transverse bottom of said second cup-shaped ring.

3. The spring return device according to claim 2 wherein:
    said metal wire of said helical spring is cylindrical in shape; and
    said cylindrical section extending between said flange and said larger end of said truncated cone of said first cup-shaped ring has an axial length which is approximately equal to the diameter of said metal wire of said helical spring.

4. The spring return device according to claim 3 wherein said spring return device is an hydraulic distributor.

5. The spring return device according to claim 2 wherein said spring return device is a hydraulic distributor.

6. The spring return device according to claim 1 wherein:
    said metal wire of said helical spring is cylindrical in shape; and
    said cylindrical section extending between said flange and said larger end of said truncated cone of said first cup-shaped ring has an axial length which is approximately equal to the diameter of said metal wire of said helical spring.

7. The spring return device according to claim 6 wherein said spring return device is an hydraulic distributor.

8. The spring return device according to claim 1 wherein said spring return device is an hydraulic distributor.

* * * * *

UNITED STATES PATENT AND TRADEMARK OFFICE
CERTIFICATE OF CORRECTION

PATENT NO. : 4,615,507

DATED : October 7, 1986

INVENTOR(S) : Tardy, et al.

It is certified that error appears in the above-identified patent and that said Letters Patent is hereby corrected as shown below:

In the Abstract

Line 10, delete "cylindrial" and insert ---- cylindrical ----.

Signed and Sealed this

Thirty-first Day of March, 1987

Attest:

DONALD J. QUIGG

Attesting Officer

Commissioner of Patents and Trademarks